United States Patent
Lin et al.

(10) Patent No.: US 12,507,409 B2
(45) Date of Patent: Dec. 23, 2025

(54) MEMORY DEVICES AND METHODS OF MANUFACTURING THEREOF

(71) Applicant: Taiwan Semiconductor Manufacturing Company, Ltd., Hsinchu (TW)

(72) Inventors: Meng-Han Lin, Hsinchu (TW); Chia-En Huang, Hsinchu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 984 days.

(21) Appl. No.: 17/672,597

(22) Filed: Feb. 15, 2022

(65) Prior Publication Data

US 2023/0262977 A1 Aug. 17, 2023

(51) Int. Cl.
*H10B 43/27* (2023.01)
*G11C 16/04* (2006.01)
*H10B 41/10* (2023.01)
*H10B 41/27* (2023.01)
*H10B 43/10* (2023.01)

(52) U.S. Cl.
CPC ......... *H10B 43/27* (2023.02); *G11C 16/0483* (2013.01); *H10B 41/10* (2023.02); *H10B 41/27* (2023.02); *H10B 43/10* (2023.02)

(58) Field of Classification Search
CPC ........ H10B 41/10; H10B 41/27; H10B 43/10; H10B 43/20; H10B 41/20; H10B 43/27; G11C 16/0416; G11C 16/0483; G11C 16/0408; G11C 16/0466; H10D 30/6728; H10D 30/6215; H10D 30/6713
See application file for complete search history.

(56) References Cited

U.S. PATENT DOCUMENTS 10,269,820 B1 4/2019 Kaminaga
10,727,243 B1* 7/2020 Lue .................. H10D 64/035
(Continued)

FOREIGN PATENT DOCUMENTS

TW 202115914 A 4/2021

OTHER PUBLICATIONS

Office Action issued in connection with Taiwan Appl. No. 111114136 dated Oct. 31, 2023.

*Primary Examiner* — Jessica S Manno
*Assistant Examiner* — Victor Joseph Lasasso
(74) *Attorney, Agent, or Firm* — Foley & Lardner LLP

(57) ABSTRACT

A semiconductor device includes a first and a second areas. The first area includes a plurality of first conductive stripes extending along a lateral direction and spaced from one another along a vertical direction, a first memory layer extending along the vertical direction, a first semiconductor layer extending along the vertical direction and coupled to a portion of the first memory layer, and second and third conductive stripes extending along the vertical direction, wherein the second and third conductive stripes are coupled to end portions of a sidewall of the first semiconductor layer. The second area includes a plurality of conductive sheets extending along the lateral direction and spaced from one another along the vertical direction, a second memory layer extending along the vertical direction and wrapped by the plurality of conductive sheets, and a second semiconductor layer extending along the vertical direction and wrapped by the second memory layer.

20 Claims, 14 Drawing Sheets

(56) References Cited

U.S. PATENT DOCUMENTS

| | | | |
|---|---|---|---|
| 2018/0350823 A1* | 12/2018 | Or-Bach | H10B 43/20 |
| 2019/0074441 A1 | 3/2019 | Kikuchi et al. | |
| 2019/0312051 A1 | 10/2019 | Park et al. | |
| 2020/0026990 A1* | 1/2020 | Lue | G06N 3/063 |
| 2020/0051990 A1* | 2/2020 | Harari | G11C 16/0483 |
| 2020/0091189 A1 | 3/2020 | Kim et al. | |
| 2022/0045060 A1* | 2/2022 | Sills | H10B 12/20 |

* cited by examiner

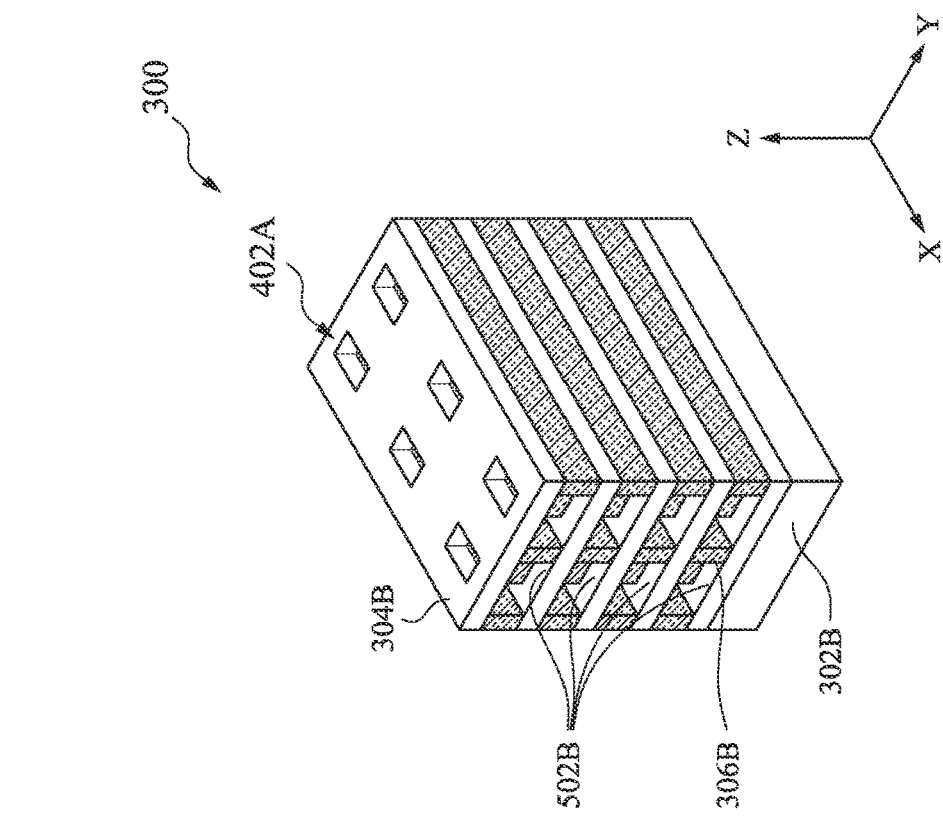
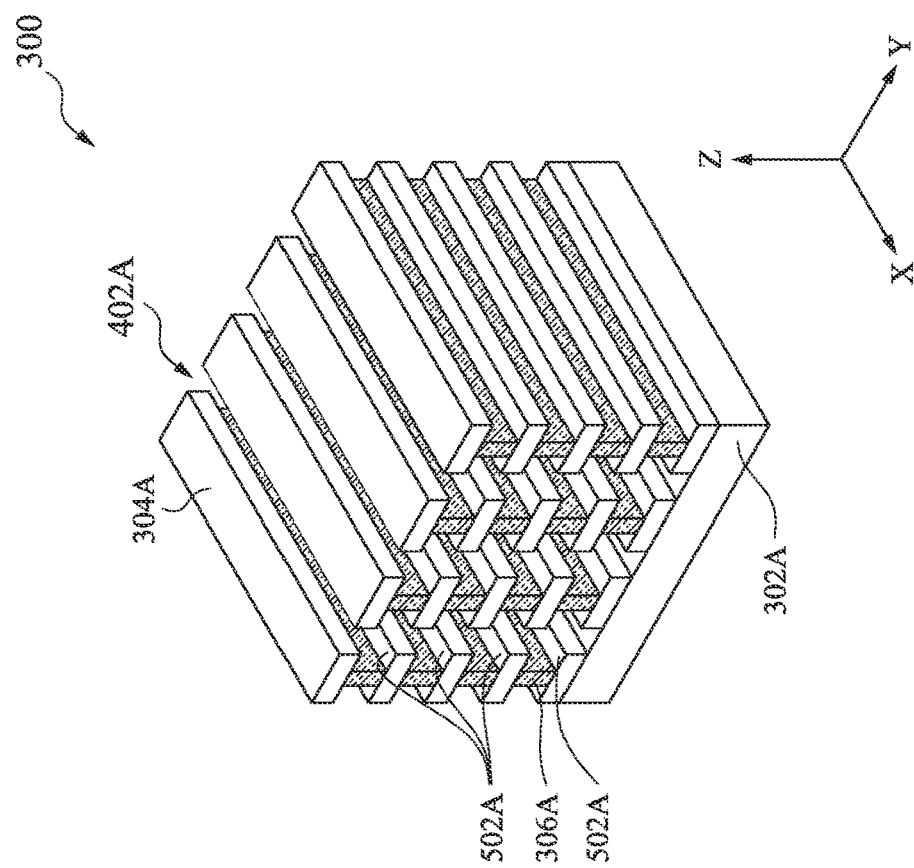
FIG. 5B
FIG. 5A

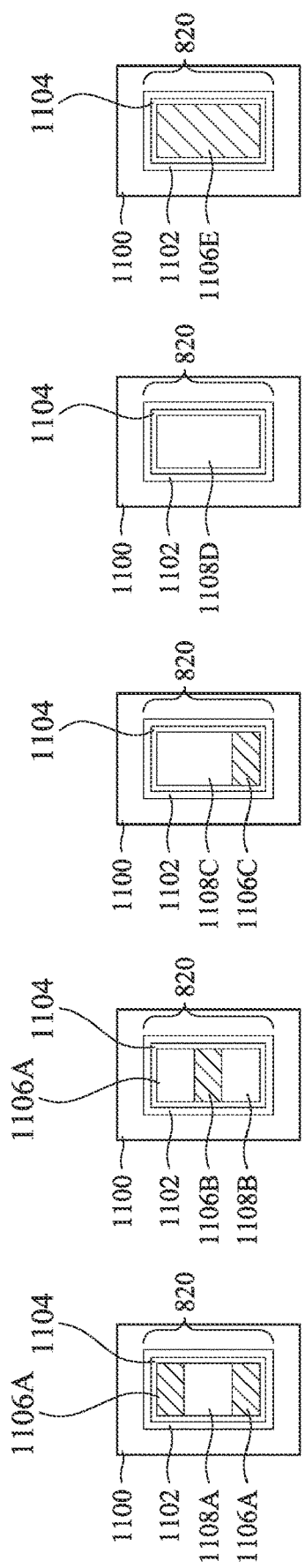

MEMORY DEVICES AND METHODS OF MANUFACTURING THEREOF

BACKGROUND

The semiconductor industry has experienced rapid growth due to continuous improvements in the integration density of a variety of electronic components (e.g., transistors, diodes, resistors, capacitors, etc.). For the most part, this improvement in integration density has come from repeated reductions in minimum feature size, which allows more components to be integrated into a given area.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A, 3B, 4A, 4B, 5A, 5B, 6A, 6B, 7A, 7B, 8A, 8B, 9A, 9B illustrate perspective views of an example semiconductor device during various fabrication stages, made by the method of FIG. 2, in accordance with some embodiments.

FIGS. 10, 11A, 11B, 11C, 11D, 11E, 12A, 12B, 12C, 13A, 13B, 13C, 13D, 13E, and 13F illustrate top or cross-sectional views of a portion of an example semiconductor device during various fabrication stages, made by the method of FIG. 2, in accordance with some embodiments.

DETAILED DESCRIPTION

Figure 1:
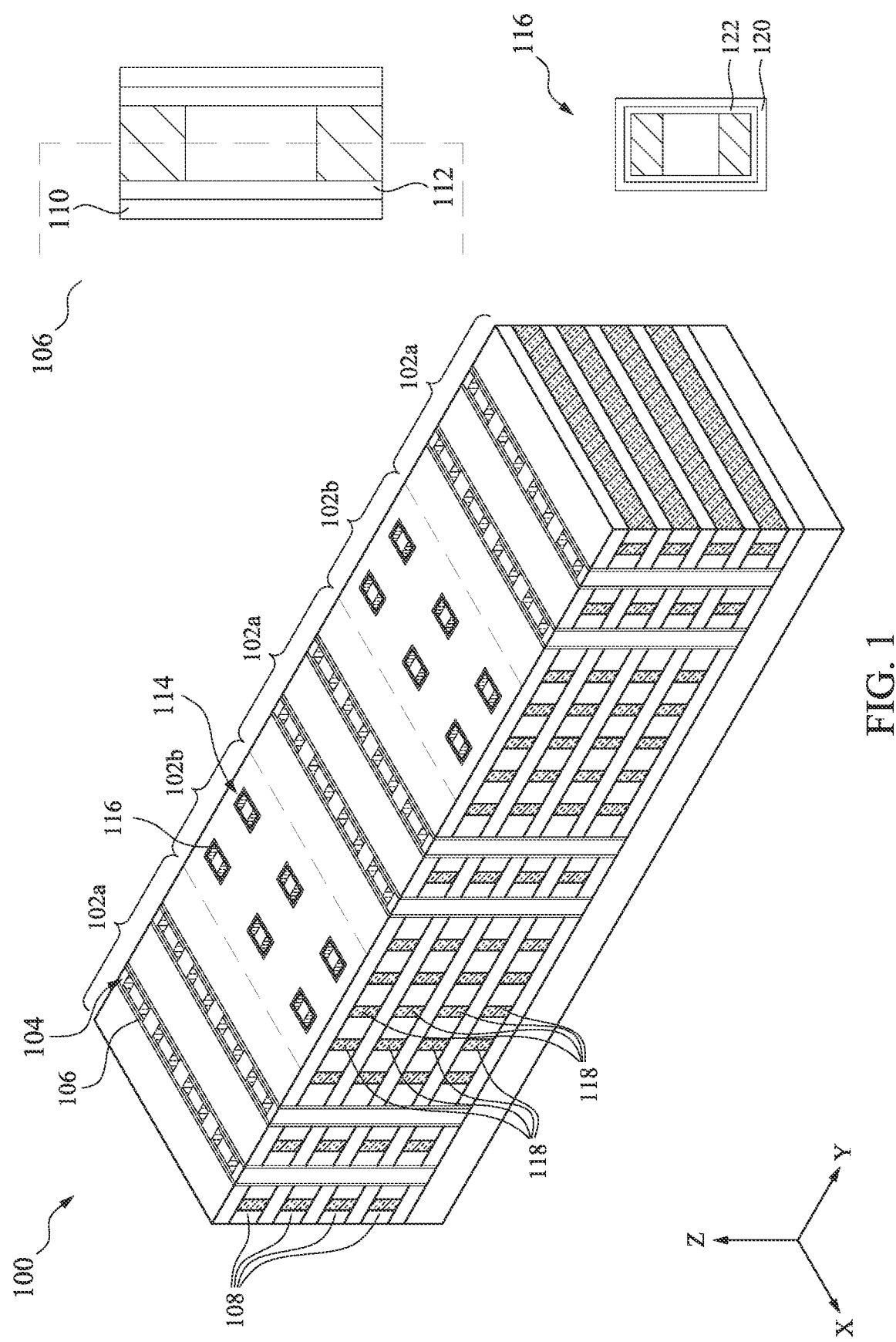
FIG. 1 is a perspective view of an example memory device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The large scale integration and planar scaling of individual chips is reaching an expensive limit. If individual chips now, and later memory blocks, memory macros, and processing cores, can be tightly linked in optimally designed and processed small footprint vertical stacks, then performance can be increased, power reduced and cost contained. An example of such vertically stack devices include a three-dimensional (3D) memory device.

In general, 3D memory devices include an array of memory cells formed in a stack of insulating layers and gate layers. The memory cells are formed across multiple memory layers (levels, or otherwise tiers) over a substrate. For example, each memory cell can be constituted by: a portion of a semiconductor layer continuously extending along a vertical direction of the array, a portion of a memory film continuously extending along the vertical direction, a first conductive structure continuously extending along the vertical direction (which functions as a drain electrode), a second conductive structure continuously extending along the vertical direction (which functions as a source electrode), and one of a number of third conductive structures continuously extending along a first lateral direction of the array (which functions as a gate electrode). The drain electrode, source electrode, and gate electrode may be operatively coupled to or function as a "bit line (BL)," a "source/select line (SL), and a "word line (WL)," respectively, of the memory cell.

When forming such a 3D memory device (e.g., its WLs), the process typically includes patterning the stack with a number of patternable layers (e.g., a first hardmask layer overlaying the stack, a second hardmask layer overlaying the first hardmask layer, and a photoresist overlaying the second hardmask layer), sequentially etching the photoresist, the second hardmask layer, and then the first hardmask layer to form a pattern over the stack, and etching the stack to form a number of trenches extending through the stack. However, a large discrepancy of pattern density between a first area where the array of memory cells is formed and a second area where no array is formed may result in process contamination. For example, in general, the first and second hardmask layers are uniformly deposited over the stack. The large discrepancy of pattern density between these two areas can cause some of the patternable layers in the second area to still remain over the stack, which are supposed to be removed after forming the trenches. Such remaining patternable layer(s) in some of the areas can fail some of the following processes (e.g., a polishing process). Thus, the existing 3D memory device or the methods for forming the same has not been entirely satisfactory in some aspects.

Embodiments of the present disclosure are discussed in the context of forming a semiconductor device, and particularly in the context of forming a 3D memory device that is immune from the above-identified issues. For example, the present disclosure provides a substrate including a first area and a second area. The first area is configured to form one or more active memory arrays, and the second area is configured to form one or more dummy memory arrays. The first area and the second area can be located immediately next to each other. Specifically, each of the active memory arrays in the first area includes a number of access lines (e.g., BLs, SLs, WLs), while the each of the dummy memory arrays may also include a number of access lines (e.g., at least one of: BLs, SLs, WLs) that can be concurrently formed with the access lines in the first area. By concurrently forming the access lines in the second area (i.e., concurrently forming the dummy memory arrays with the active memory arrays), process contamination resulting from the high discrepancy of pattern density can be significantly reduced.

FIG. 1 illustrates a perspective view of a semiconductor device 100 including a number of first areas 102a and a number of second areas 102b, according to an embodiment. The first area 102a, which includes an active memory array 104, and the second area 102b, which includes a dummy memory array 114, are located immediately next to each other in a lateral direction (e.g., the Y direction).

The active memory array 104 may include a plurality of memory strings 106 laterally spaced from one another. Each memory string 106 may comprise a plurality of conductive structures 108 that extend along a lateral direction (e.g., the X direction) and spaced from one another along a vertical direction (e.g., the Z direction), a first memory layer 110 extending along the vertical direction, and a first semiconductor layer 112 extending along the vertical direction and coupled to a portion of the first memory layer 110.

Each dummy memory array 114 may comprise a plurality of dummy memory strings 116 laterally spaced from one another. Each dummy memory strings 116 includes a plurality of conductive layers 118 extending along the lateral direction (e.g., the X direction) and spaced from one another along a vertical direction (e.g., the Z direction), a second memory layer 120 extending along the vertical direction and wrapped by the plurality of conductive layer 118, and a second semiconductor layer 122 extending along the vertical direction and wrapped by the second memory layer 120. That is, a plurality of dummy memory strings 116 including a second memory layer 120 are discretely wrapped by the plurality of conductive layers 118. Although the embodiment shown in FIG. 1 includes three first areas 102a and two second areas 102b, it should be understood that the semiconductor device 100 may include any number of the first areas and the second areas, while remaining within the scope of the present disclosure.

Figure 2:
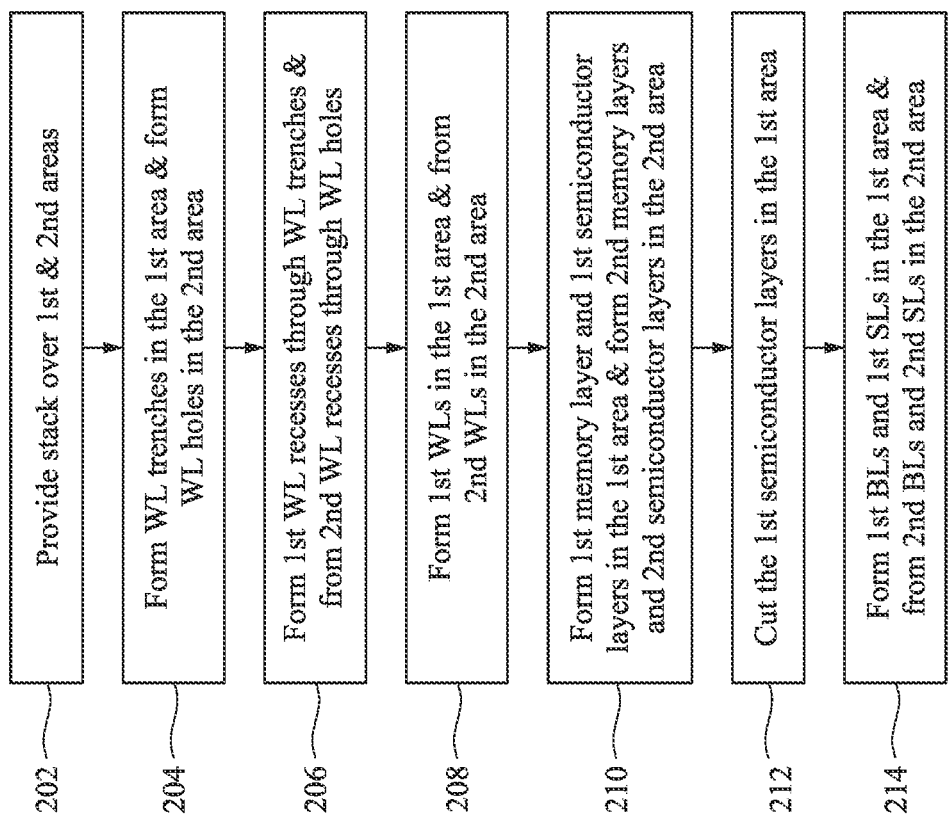
FIG. 2 is an example flow chart of a method for fabricating a memory device, in accordance with some embodiments.

FIG. 2 illustrates a flowchart of a method 200 to form a semiconductor device 300, for example, a 3D memory device, according to an embodiment. For example, at least some of the operations (or steps) of the method 200 can be used to form a memory device that is substantially similar to the semiconductor device 100. It should be noted that the method 200 is merely an example, and is not intended to limit the present disclosure. Accordingly, it is understood that additional operations may be provided before, during, and after the method 200 of FIG. 2, and that some other operations may only be briefly described herein.

In some embodiments, operations of the method 200 may be associated with cross-sectional views of an example semiconductor device 300 at various fabrication stages as shown in FIGS. 3A, 3B, 4A, 4B, 5A, 5B, 6A, 6B, 7A, 7B, 8A, 8B, 9A, and 9B, respectively, which will be discussed in further detail below. Although FIGS. 3A to 9B illustrate the semiconductor device 300 including a number of active memory arrays and a number of dummy memory arrays, it should be understood that the semiconductor device 300 may include a number of other devices such as inductors, fuses, capacitors, coils, etc., while remaining within the scope of the present disclosure.

The method 200 may generally include concurrently forming, over a first area of a substrate, a plurality of memory strings separated from one another along a vertical direction and extending along a first lateral direction, and forming, over a second area of the substrate, a plurality of conductive layers separated from one another along the vertical direction and extending along the first lateral direction. The method further includes forming a first memory layer extending along the vertical direction and coupled to the plurality of memory strings, forming a first semiconductor layer extending along the vertical direction and coupled to a portion of the first memory layer, forming a second memory layer extending along the vertical direction and wrapped by the plurality of conductive layers, and forming a second semiconductor layer extending along the vertical direction and wrapped by the second memory layer.

Figure 3B:
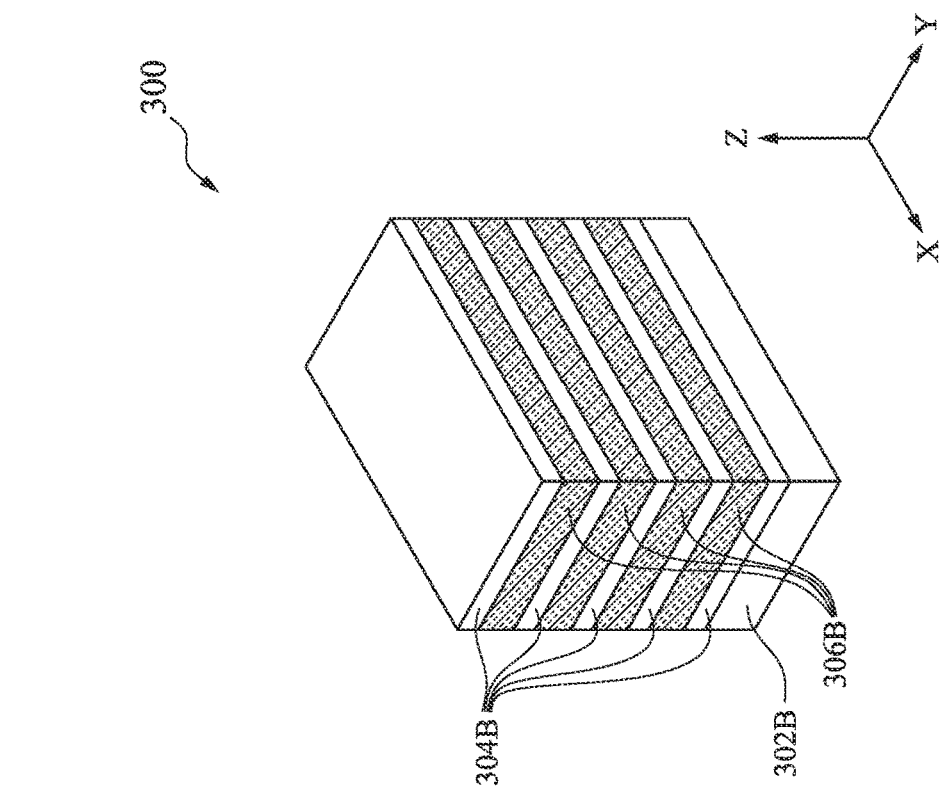
Figure 3A:
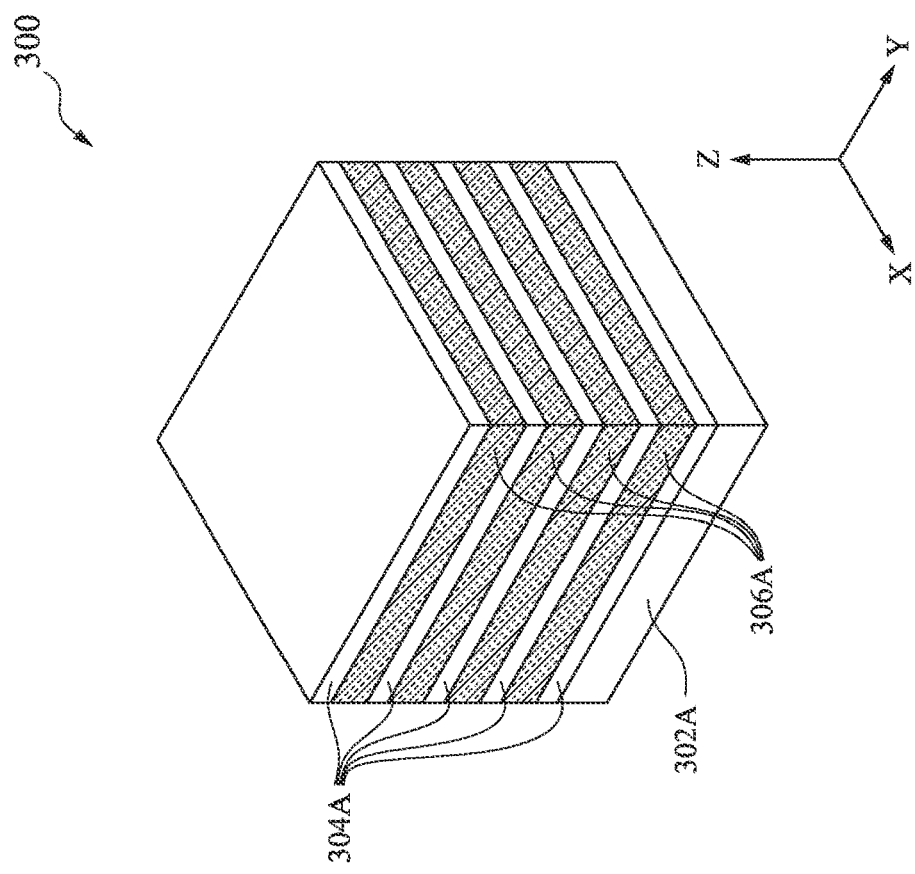

Expanding further, the method 200 starts with operation 202 that includes providing a substrate including a first area and a second area, for example, first area 302A and second area 302B shown in FIGS. 3A and 3B, respectively. As illustrated in FIG. 1, such two areas, defining respective footprints of an active memory array and a dummy memory array, may be disposed immediately next to each other. The areas 302A and 302B may sometimes be referred to as substrates 302A and 302B in the following discussions.

The substrate 302A, 302B may be a semiconductor substrate, such as a bulk semiconductor, a semiconductor-on-insulator (SOI) substrate, or the like, which may be doped (e.g., with a p-type or an n-type dopant) or undoped. The substrate 302A, 302B may be a wafer, such as a silicon wafer. Generally, an SOI substrate includes a layer of a semiconductor material formed on an insulator layer. The insulating layer may be, for example, a buried oxide (BOX) layer, a SiO layer, a SiN layer, or the like. The insulator layer is provided on a substrate, typically a silicon or glass substrate. Other substrates, such as a multi-layered or gradient substrate may also be used. In some embodiments, the semiconductor material of the substrate 302A, 302B may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof.

Further at operation 202, a stack is uniformly formed on the substrates 302A and 302B. The stack includes a plurality of insulating layers (e.g., the insulating layers 304A, 304B) and a plurality of sacrificial layers (e.g., the sacrificial layers 306A, 306B) alternately stacked on top of each other in the vertical direction (e.g., the Z direction). Although the stack is directly in contact with the substrates 302A and 302B in the illustrated embodiment of FIGS. 3A-B (and the following figures), it should be understood that when the substrates 302A-B are embodied as a semiconductor material, the memory device 300 can include a number of metallization layers (e.g., a dielectric layer embedding a number of metal interconnect structures) disposed between the substrates 302A-B and the stack. As such, the substrates 302A-B may be implemented as a dielectric material (e.g., silicon nitride) that functions as an etch stop layer formed over the metallization layers.

For example, one of the sacrificial layers 306A, 306B is disposed over one of the insulating layers 304A, 304B, then another one of the insulating layers 304A, 304B is disposed on the sacrificial layer 306A, 306B, so on and so forth. As shown in FIGS. 3A and 3B, a topmost layer (e.g., a layer distal most from the substrate 302A, 302B) and a bottommost layer (e.g., a layer most proximate to the substrate 302A, 302B) of the stack may include an insulating layer 304A, 304B. While FIGS. 3A and 3B show the stack as including 5 insulating layers 304A, 304B and 4 sacrificial layers 306A, 306B, the stack may include any number of insulating layers and sacrificial layers (e.g., 4, 5, 6, 7, 8, or even more). In various embodiments, if the number of sacrificial layers 306A, 306B in the stack is n, a number of insulating layers 304A, 304B in the stack may be n+1.

Each of the plurality of insulating layers 304A, 304B may have about the same thickness, for example, in a range of about 5 nm to about 100 nm, inclusive. Moreover, the sacrificial layers 306A, 306B may have the same thickness or different thickness from the insulating layers 304A, 304B. The thickness of the sacrificial layers 306A, 306B may range from a few nanometers to few tens of nanometers (e.g., in a range of 5 nm to 100 nm, inclusive).

The insulating layers 304A, 304B and the sacrificial layers 306A, 306B have different compositions. In various embodiments, the insulating layers 304A, 304B and the sacrificial layers 306A, 306B have compositions that provide for different oxidation rates and/or different etch selectivity between the respective layers. In some embodiments, the insulating layers 304A, 304B may be formed from SiO, and the sacrificial layers 306A, 306B may be formed from SiN. The sacrificial layers 306A, 306B are merely spacer layers that are eventually removed and do not form an active component of the semiconductor device 100.

In various embodiments, the insulating layers 304A, 304B and/or the sacrificial layers 306A, 306B may be epitaxially grown from the substrate 302A, 302B. For example, each of the insulating layers 304A, 304B and the sacrificial layers 306A, 306B may be grown by a molecular beam epitaxy (MBE) process, a chemical vapor deposition (CVD) process such as a metal organic CVD (MOCVD) process, a furnace CVD process, and/or other suitable epitaxial growth processes. During the epitaxial growth, the crystal structure of the substrate 302A, 302B extends upwardly, resulting in the insulating layers 304A, 304B and the sacrificial layers 306A, 306B having the same crystal orientation as the substrate 302A, 302B. In other embodiments, the insulating layers 304A, 304B and the sacrificial layers 306A, 306B may be grown using an atomic layer deposition (ALD) process.

Figure 4B:
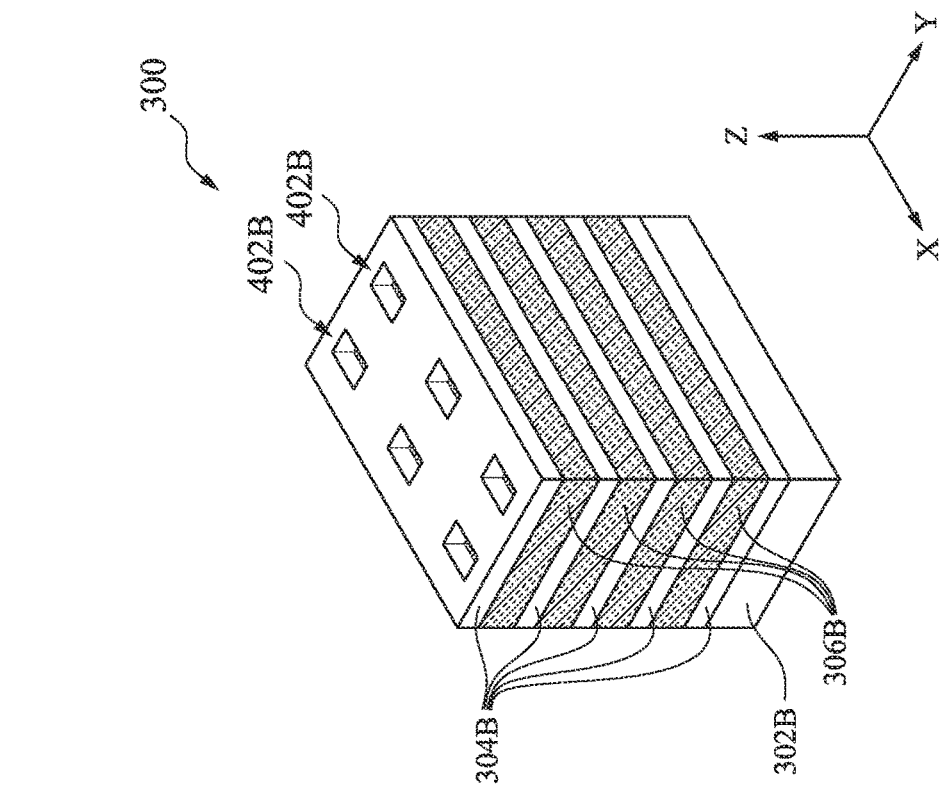
Figure 4A:
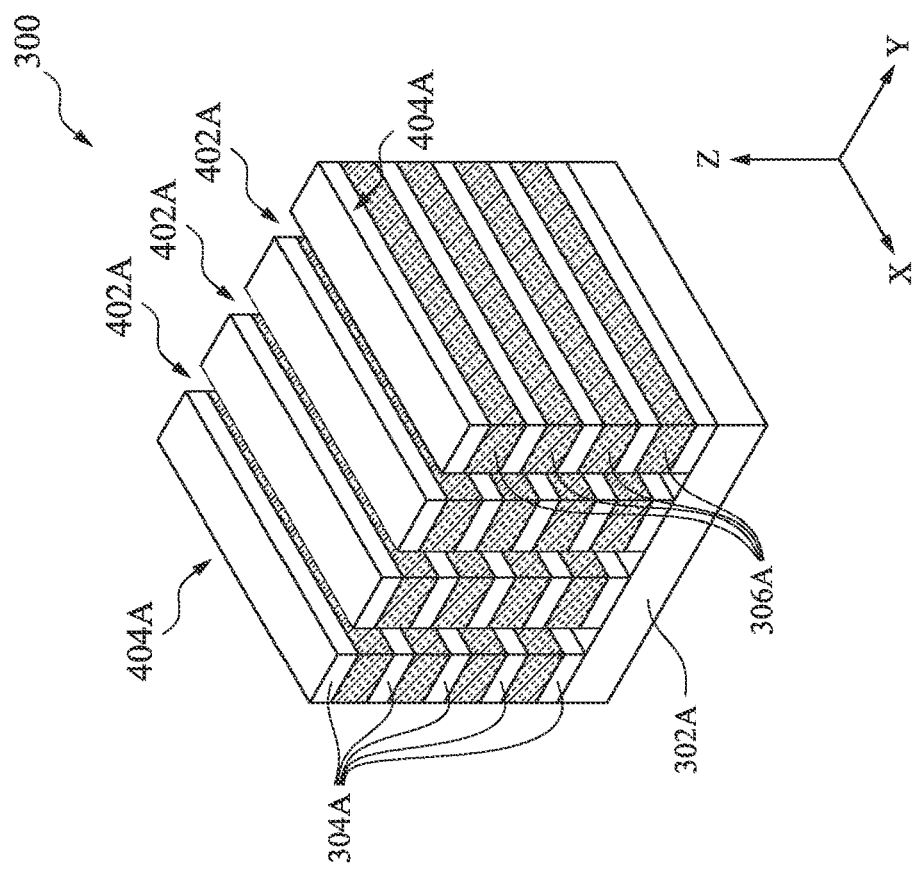

Corresponding to operation 204 of FIG. 2, FIGS. 4A and 4B are perspective views of the semiconductor device 300 in which a number of word line (WL) trenches 402A and a number of WL holes 402B are formed in the first area 302A and the second area 302B, respectively, at one of the various stages of fabrication, in accordance with various embodiments.

As shown in FIG. 4A, in the first area 302A where at least one active memory array is to be formed, the WL trenches 402A extend along a lateral direction (e.g., the X direction). Although four WL trenches 402A are shown in the illustrated embodiment of FIG. 4A, it should be understood that the first area 320A can include any number of WL trenches 402A, while remaining within the scope of the present disclosure. As shown in FIG. 4B, in the second area 302B where at least one dummy memory array is to be formed, the WL trenches are configured as holes 402B formed through portions of the stack in the vertical direction (e.g., the Z direction). Although six WL holes 402B are shown in the illustrated embodiment of FIG. 4B, it should be understood that the second area 302B can include any number of WL holes, while remaining within the scope of the present disclosure.

The WL trenches 402A and WL holes 402B can be formed using one or more etching processes, in some embodiments. The etching processes may each include, for example, a plasma etching process, reactive ion etch (RIE) process, a neutral beam etch (NBE) process, the like, or combinations thereof. In some embodiments, plasma etching process (including radical plasma etching, remote plasma etching, and other suitable plasma etching processes, RIE, DRIE), gas sources such as $Cl_2$, HBr, $CF_4$, $CHF_3$, $CH_2F_2$, $CH_3F$, $C_4F_6$, $BCl_3$, $SF_6$, $H_2$, $NF_3$, and other suitable etch gas sources and combinations thereof can be used with passivation gases such as $N_2$, $O_2$, $CO_2$, $SO_2$, CO, $CH_4$, $SiCl_4$, and other suitable passivation gases and combinations thereof. Moreover, for the plasma etching process, the gas sources and/or the passivation gases can be diluted with gases such as Ar, He, Ne, and other suitable dilutive gases and combinations thereof to form the cavities. As a non-limiting example, a source power of 10 Watts to 3,000 Watts, a bias power of 0 watts to 3,000 watts, a pressure of 1 millitorr to 5 torr, and an etch gas flow of 0 sccm to 5,000 sccm may be used in the etching process. However, it is noted that source powers, bias powers, pressures, and flow rates outside of these ranges are also contemplated. The etching processes may be anisotropic.

The etching processes used to form the WL trenches 402A and WL holes 402B etches through each of the sacrificial layers 306A, 306B and insulating layers 304A, 304B of the stack such that each of the trenches and holes 402A, 402B extend form the topmost insulating layer 304A, 304B through the bottommost insulating layer 304A, 304B to the substrate 302A, 302B.

In the first area 402A, as a result of forming the WL trenches 402A, fin-like structures 404A are formed. As shown, the fin-like structures 404A (sometimes referred to as stripe structures) all extend along a lateral direction (e.g., the X direction), and are in parallel with one another. Each of the fin-like structures 404A includes a number of layers (or tiers) alternately stacked on top of one another. In particular, each fin-like structure 404A includes an alternate stack of a number of (remaining portions of) the insulating layers 304A, 304B, a number of (remaining portions of) the sacrificial layers 306A, 306B.

Corresponding to operation 206 of FIG. 2, FIGS. 5A and 5B are perspective view of the semiconductor device 300 in which a number of first WL recesses 502A and a number of second WL recesses 502B are formed in the first area 302A and second area 302B, respectively, at one of the various stages of fabrication, in accordance with various embodiments.

To form the WL recesses 502A and 502B, portions of each of the sacrificial layers 306A, 306B may be further (e.g., laterally) recessed. The sacrificial layers 306A, 306B can be recessed by performing an etching process that etches the sacrificial layers 306A, 306B selective to the insulating layers 304A, 304B through the WL trenches and holes 402A, 402B. Alternatively stated, the insulating layers 304A, 304B may remain substantially intact throughout the selective etching process. In the first area 302A, in each of the fin-like structures 404A, end portions of the sacrificial layers 306A may be laterally recessed (e.g., along the Y direction). In some embodiments, each of the sacrificial layers 306A may be inwardly recessed from its both ends (along the Y direction) with a certain etch-back distance. Such an etch-back distance can be controlled to be less than one half the width of the sacrificial layer 306A along the Y direction, so as to remain a central portion of the sacrificial layers 306A intact, as shown in FIG. 5A. Similarly in the second area 302B, with respect to each WL holes 402B, end portions of the sacrificial layers 306B may be laterally and transversely recessed (e.g. along the X and Y directions). In some embodiments, each of the sacrificial layers 306B may be recessed with a certain etch-back distance such that a central portion of the sacrificial layers 306B between WL holes 402B may remain intact.

The etching process can include a wet etching process employing a wet etch solution, or can be a gas phase (dry) etching process in which the etchant is introduced in a vapor phase into the first trenches (dotted lines). In the example where the sacrificial layers 306A, 306B include silicon nitride and the insulating layers 304A, 304B include silicon oxide, the etching process can include a wet etching process in which the workpiece is immersed within a wet etch tank that includes phosphoric acid, which etches silicon nitride of the sacrificial layer 306A, 306B selective to silicon oxide, silicon, and various other materials of the insulating layers 304A, 304B.

Figure 6B:
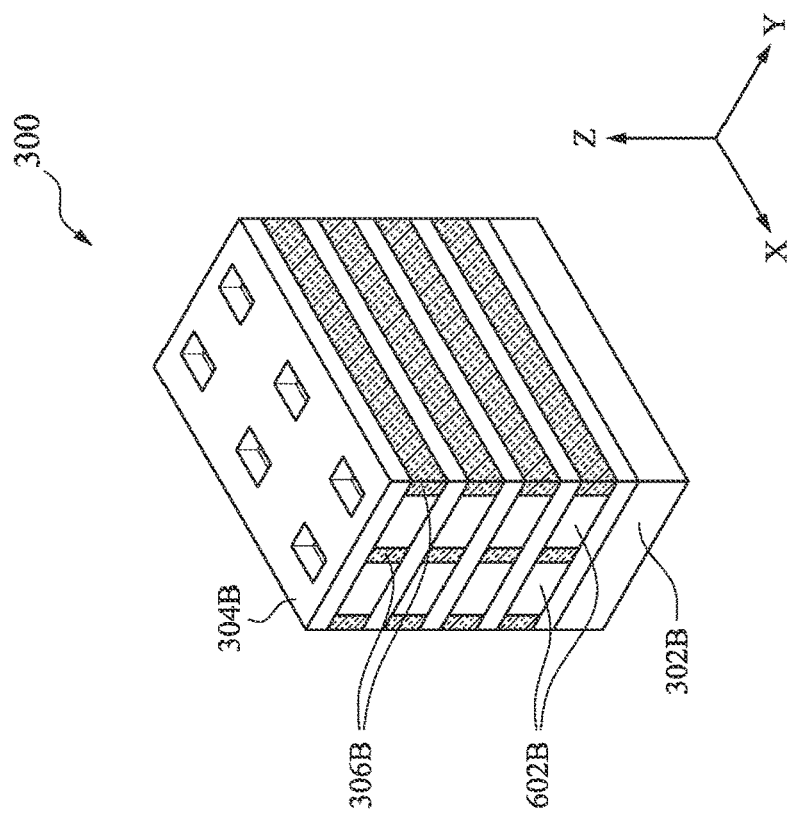
Figure 6A:
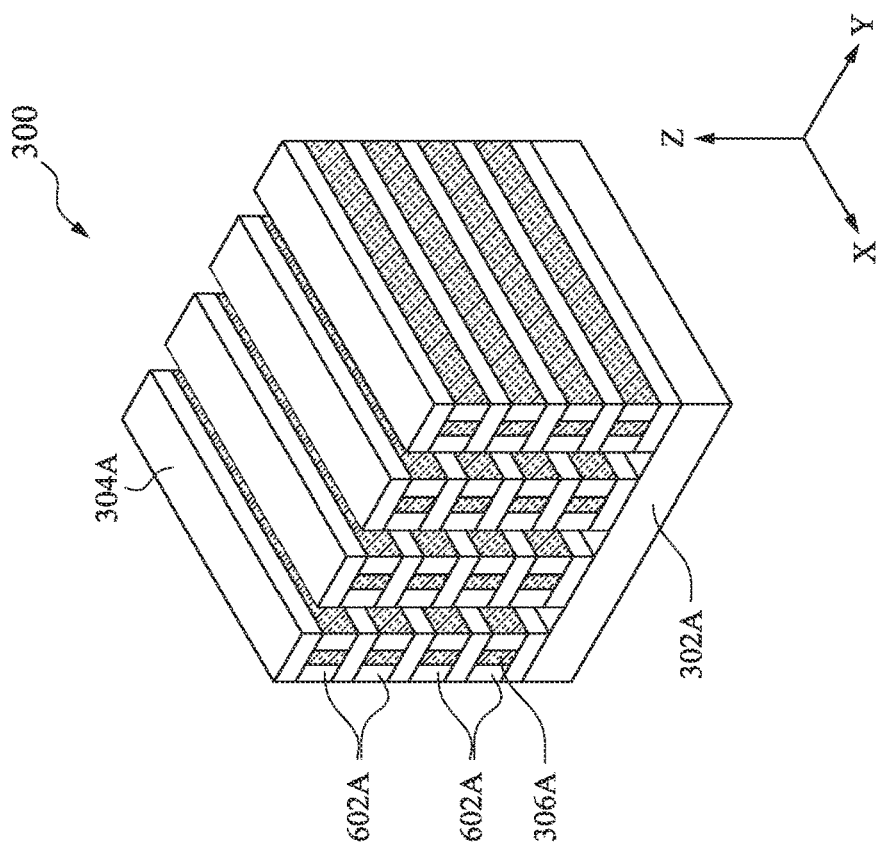

Next, corresponding to operation 208, a metallic fill layer can be (e.g., conformally) formed to fill the WL recesses 502A and 502B inwardly extending toward the remaining sacrificial layer 306A, 306B with respect to the insulating layer 304A, 304B thereby forming the WLs 602A, 602B, as shown in FIGS. 6A and 6B, respectively. As the WLs 602A and 602B generally inherit the dimensions and profiles of the WL recesses 502A and 502B, respectively, the WLs 602A may each present a relatively narrow stripe-like profile, while the WLs 602B may each present a relatively wide sheet-like profile. Accordingly, the WLs 602A may sometimes be referred to as conductive stripes 602A, and the WLs 602B may sometimes be referred to as conductive sheets 602B. In some embodiments, the metallic fill layer includes at least one metal material selected from the group consisting of tungsten, copper, cobalt, ruthenium, titanium, tantalum, or combinations thereof. The metallic fill layer can be deposited by a conformal deposition method, which can be, for example, chemical vapor deposition (CVD), atomic layer deposition (ALD), electroless plating, electroplating, or a combination thereof.

Figure 7B:
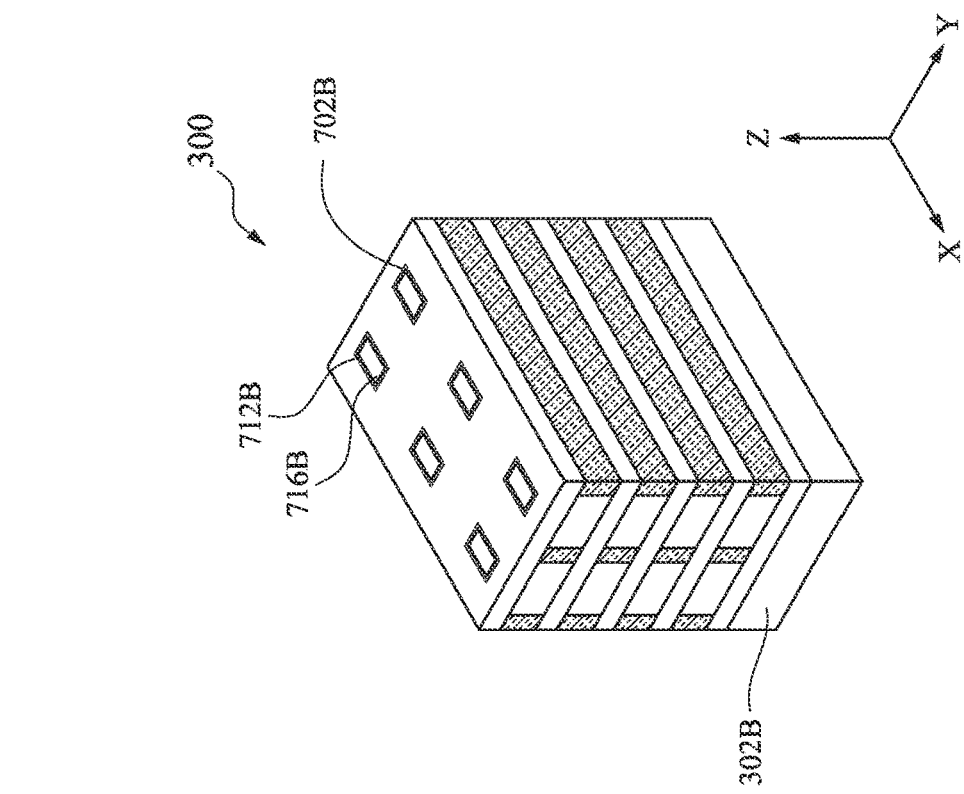
Figure 7A:
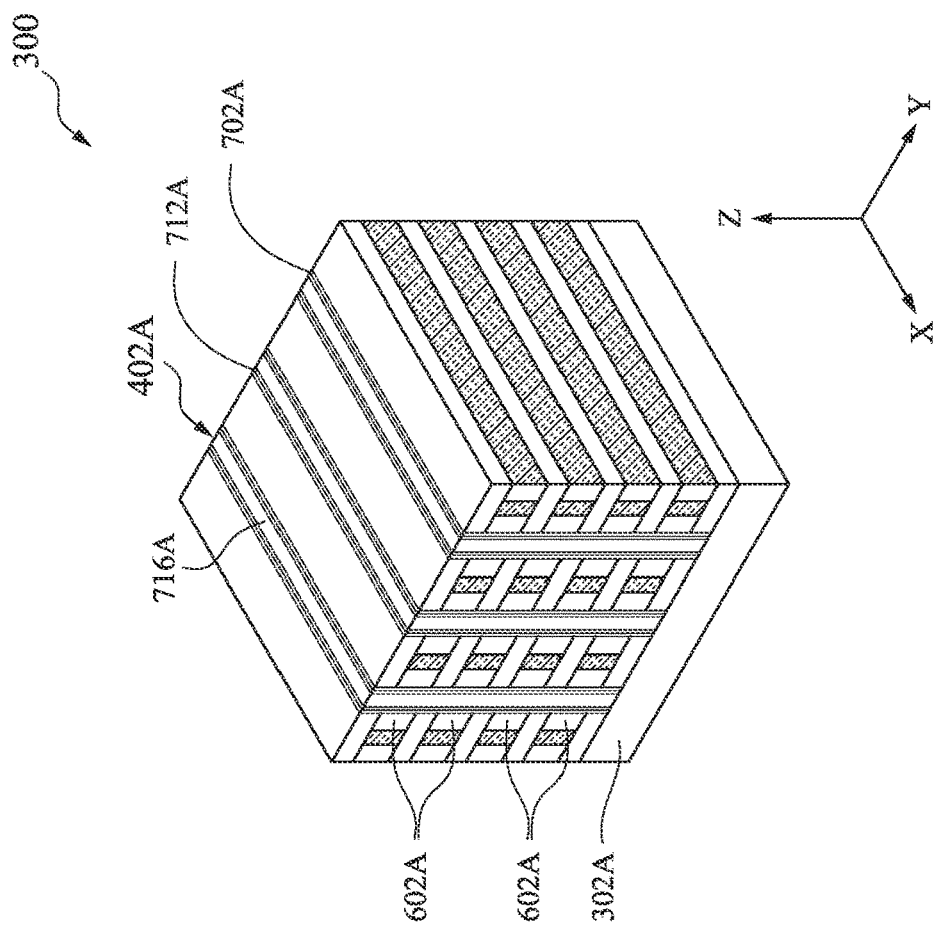

Corresponding to operation 210 of FIG. 2, FIGS. 7A and 7B are perspective views of the semiconductor device 300 in which a number of memory layers 702A followed by a number of semiconductor layers 712A are formed in the first area 302A, and a number of memory layers 702B followed by a number of semiconductor layers 712B are formed in the second area 302B, respectively, at one of the various stages of fabrication, in accordance with various embodiments.

In various embodiments, in the first area 302A, each of the memory layers 702A includes two portions, each of which is formed to extend along one of the sidewalls of a corresponding trench 402A. As such, each portion of the memory layer is in contact with a corresponding number of WLs 602A (through their respective exposed sidewalls). Over the memory layer 702A, each of the semiconductor layers 712A also includes two portions that are in contact with the two portions of a corresponding memory layer, respectively. As shown in the illustrated example of FIG. 7A, the memory layer 702A, including two portions, and the semiconductor layer 712A, including two portions, are formed in the trench 402A. In the second area 302B, each of the memory layer 702B is disposed along the sidewalls of a corresponding WL hole 402B. As such, each portion of the memory layer is in contact with a corresponding number of WLs (through their respective exposed sidewalls). Over the memory layer 702B, each of the semiconductor layers 712B radially disposed on inner surfaces of the memory layer 702B and is in contact with the memory layer 702B. As shown in the illustrated example of FIG. 7B, the memory layer 702B and the semiconductor layer 712B are formed in the WL hole 402B.

Each of the memory layers 702A, 702B may include a ferroelectric material, for example, lead zirconate titanate (PZT), PbZr/TiO$_3$, BaTiO$_3$, PbTiO$_2$, etc. However, it should be understood that the memory layers 702A, 702B may each include a charge storage layer, while remaining within the scope of the present disclosure. The memory layers 702A, 702B may be formed using physical vapor deposition (PVD), chemical vapor deposition (CVD), low pressure chemical vapor deposition (LPCVD), plasma enhanced CVD (PECVD), atomic layer deposition (ALD), MBE, any other suitable process or a combination thereof. A conformal coating may be deposited such that the memory layers 702A, 702B are each continuous on the radially inner surfaces of the WL trenches or holes.

Each of the semiconductor layers 712A, 712B is formed on radially inner surfaces (sidewalls) of the memory layer. In some embodiments, the semiconductor layers 712A, 712B may each be formed from a semiconductor material, for example, Si (e.g., polysilicon or amorphous silicon), Ge, SiGe, silicon carbide (SiC), etc. The semiconductor layers 712A, 712B may be formed using physical vapor deposition (PVD), chemical vapor deposition (CVD), low pressure chemical vapor deposition (LPCVD), plasma enhanced CVD (PECVD), atomic layer deposition (ALD), MBE, any other suitable process or a combination thereof. A conformal coating may be deposited such that the semiconductor layers 712A, 712B are each continuous on the radially inner surfaces of the memory layer.

Each of the WL trenches and holes 402A, 402B is then filled with an insulating material (e.g., SiO, SiN, SiON, SiCN, SiC, SiOC, SiOCN, the like, or combinations thereof) so as to form the inner spacer or dielectric pillars 716A, 716B. In some embodiments, the dielectric pillar 716A, 716B may be formed from the same material as the plurality of insulating layers 304A, 304B. The dielectric pillar 716A, 716B may be formed using physical vapor deposition (PVD), chemical vapor deposition (CVD), low pressure chemical vapor deposition (LPCVD), plasma enhanced CVD (PECVD), atomic layer deposition (ALD), MBE, any other suitable process or a combination thereof, a high aspect ratio process (HARP), another applicable process, or combinations thereof.

Figure 8B:
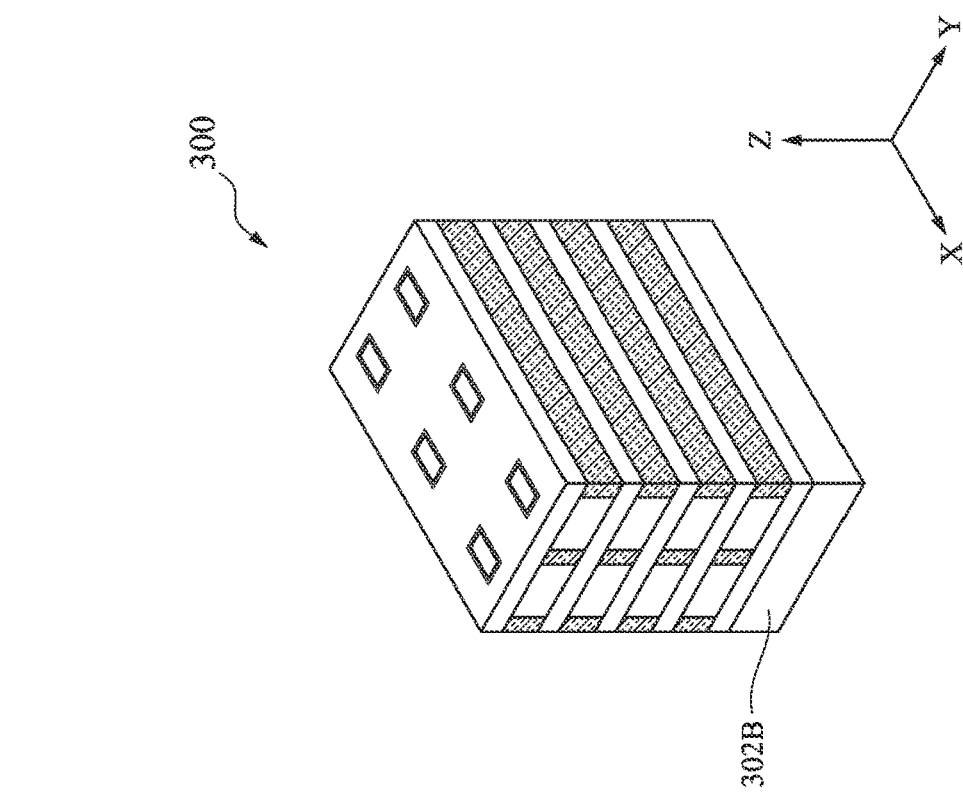
Figure 8A:
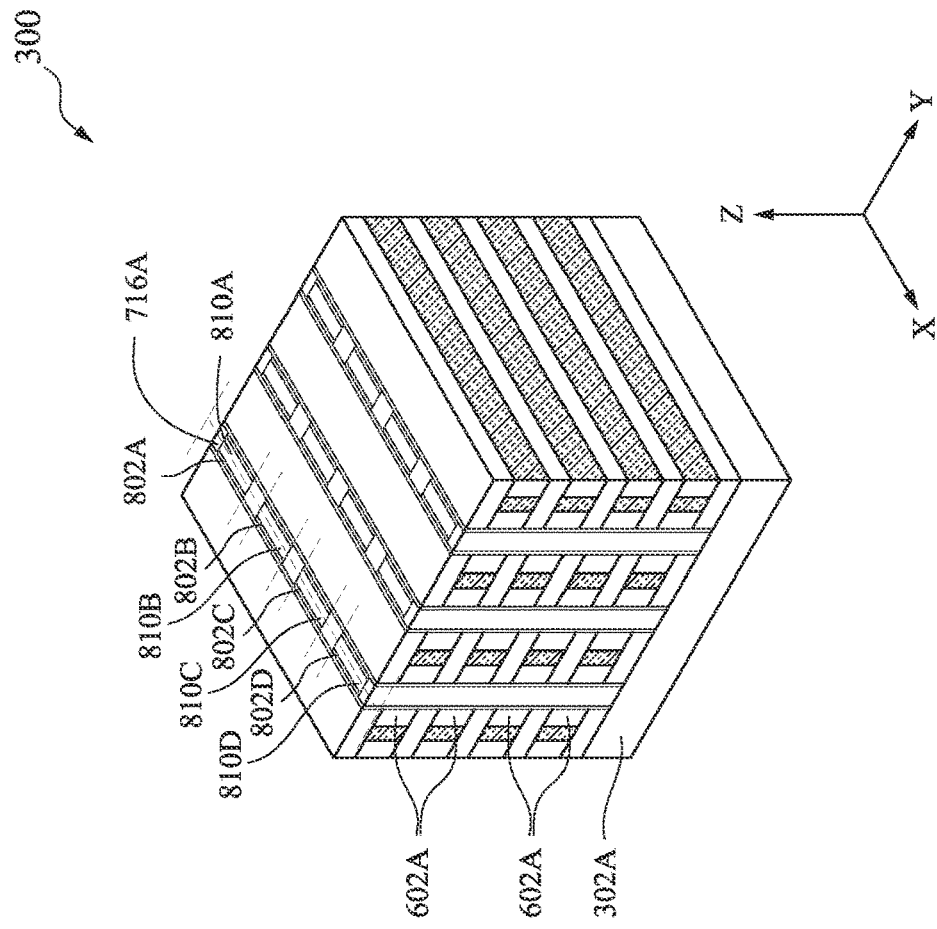

Corresponding to operation 212 of FIG. 2, FIGS. 8A and 8B are perspective views of the semiconductor device 300 in which the semiconductor layers 712A in the first area 302A are each patterned and the semiconductor layers 712B and memory layers 702B in the second area 302B may remain substantially intact, respectively, at one of the various stages of fabrication, in accordance with various embodiments.

In some embodiments, in the first area 302A, each of the semiconductor layers 712A is patterned into a number of segments, each of which can define the initial footprint of memory strings of active memory arrays. For example in FIG. 8A, the semiconductor layer 712A (e.g., on the left-hand side of the leftmost dielectric pillar 716A) is patterned into discrete segments 802A, 802B, 802C, 802D. Each of the segments 802A to 802D may serve as the channel of a memory string. Specifically, each memory string included a number of memory cells vertically spaced apart from each other, and memory cell includes a portion of the coupled segment as its channel. For example, four memory strings, 810A, 810B, 810C, and 810D, can be defined (or isolated) by the segments 802A to 802D, respectively. Each of these four memory strings 810A to 810D includes four memory cells that are at least partially defined by respective four portions of the corresponding segment and the four coupled WLs 602A. In the second area 302B, no further isolation step is conducted, according to various embodiments. For example, the second area 302B may be covered by a photoresist (not shown), while the isolation step is performed on the semiconductor layers 712A in the first area 302A.

Figure 9B:
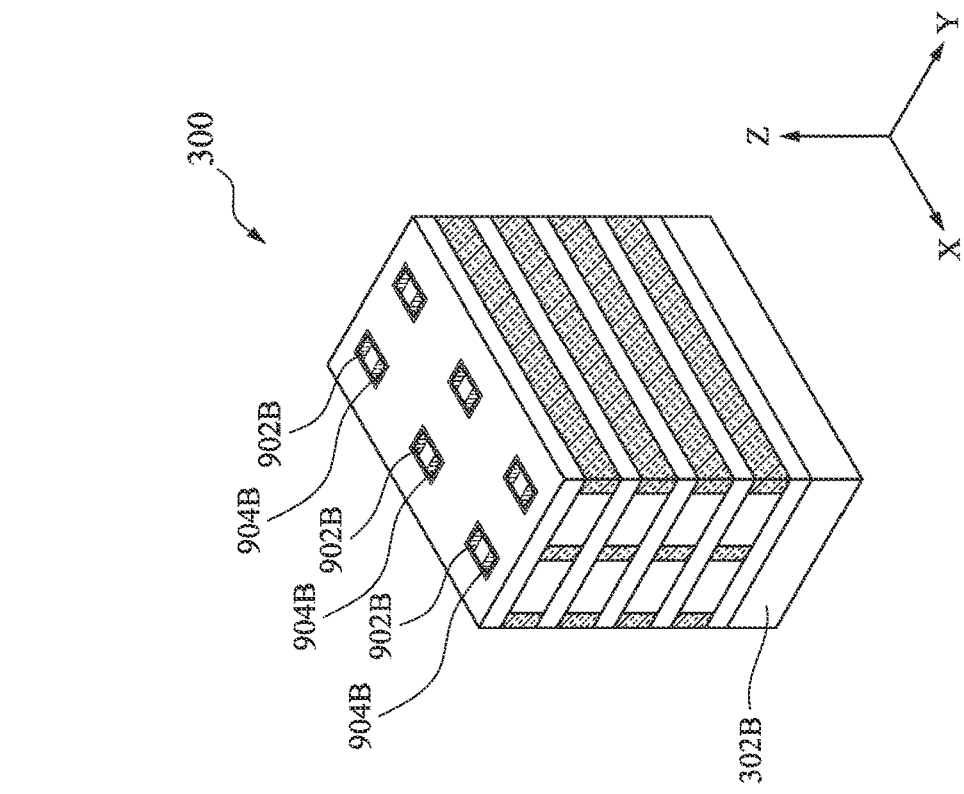
Figure 9A:
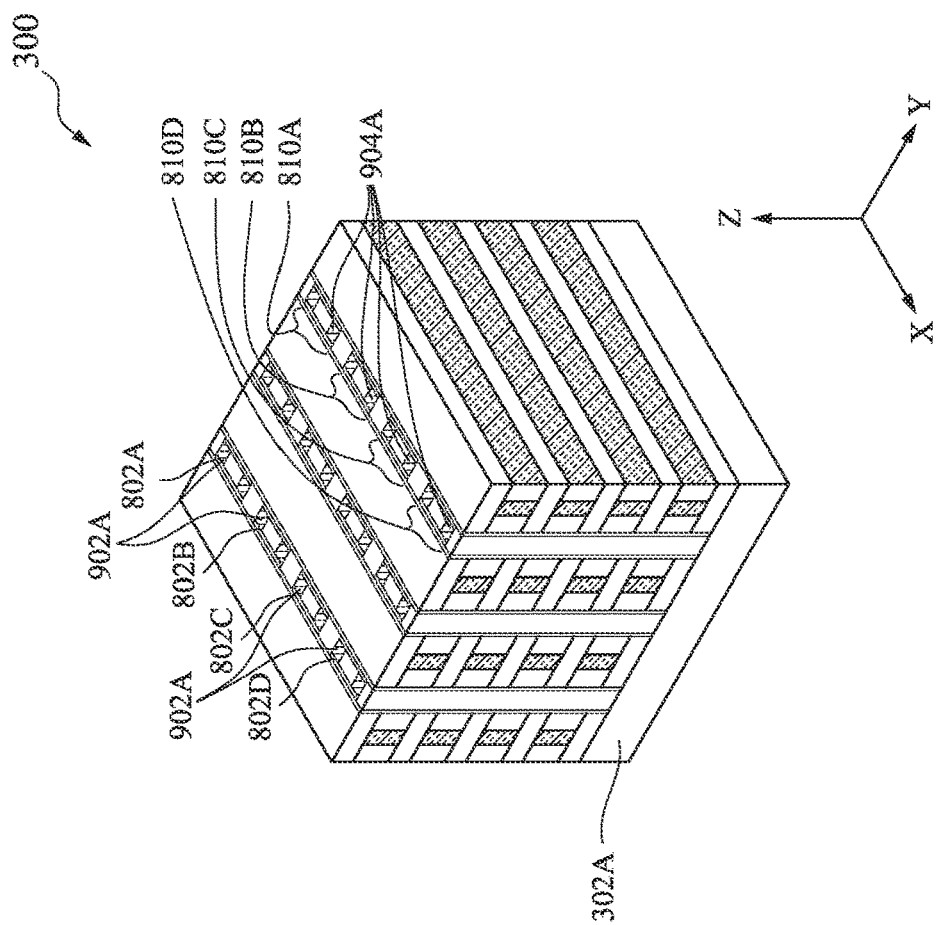

Corresponding to operation 214 of FIG. 2, FIGS. 9A and 9B are perspective views of the semiconductor device 300 in which a number of bit lines (BLs) 902A and a number of source lines (SLs) 904A are formed in the first area 302A, and a number of BLs 902B and a number of SLs 904B are formed in the second area 302B, respectively, at one of the various stages of fabrication, in accordance with various embodiments.

In some embodiments, in the first area 302A, each of the BLs 902A and SLs 904A is formed of a metallic fill material, and extends along the Z direction. As such, the BLs 902A and SLs 904A may sometimes be referred to as a metallic pillar or a conductive structure extending along a vertical direction. Each of the example memory strings 810A to 810D is coupled to a pair of BL 902A and SL 904A. Further, two memory strings in a WL trench that face to each other, any of the memory strings 810A-D and a memory string disposed next to it along the Y direction for example, can share a pair of BL 902A and SL 904A. In some embodiments, in the second area 302B, each of the BLs 902B and SLs 904B is also formed of a metallic fill material, and also extends along the vertical direction (e.g. in Z direction). Similarly, the BLs 902B and SLs 904B may sometimes be referred to as a metallic pillar or a conductive structure extending along a vertical direction. According to various embodiments of the present disclosure, upon forming the SLs 904A-B and BLs 902A-B, an active memory array and a dummy memory array may be formed in the first area 302A and second area 302B, respectively, which will be discussed in further detail below with respect to a top view of the semiconductor device 300 shown in FIG. 10.

The metallic fill layer includes at least one metal material selected from the group consisting of tungsten, copper, cobalt, ruthenium, titanium, tantalum, or combinations thereof. The metallic fill layer can be deposited by a conformal deposition method, which can be, for example, chemical vapor deposition (CVD), atomic layer deposition (ALD), electroless plating, electroplating, or a combination thereof.

Figure 10:
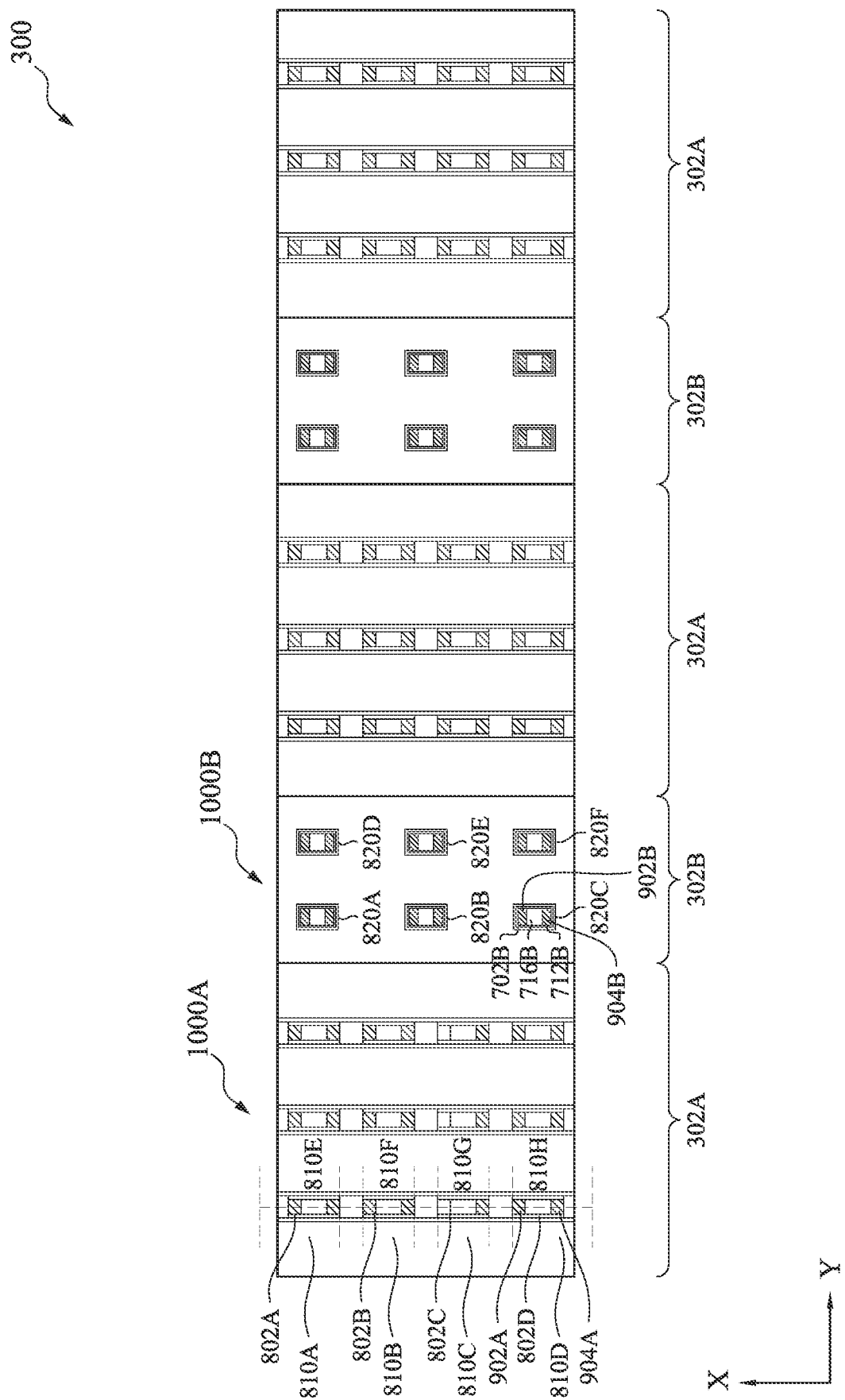

FIG. 10 is a top view of the semiconductor device 300 including a number of first areas 302A and a number of second areas 302B laterally arranged with respect to one another, according to an embodiment. As shown, each first area 302A may have at least one edge coupled with one of the second areas 302B. The first area 302A is configured to form at least one active memory array, and the second area 302B is configured to from at least one dummy memory array, where the active memory array may be operable by applying various control signals through its access lines (e.g., WLs, BLs, SLs) while the dummy memory array may not be operable. For example, even with the access lines concurrently formed with the access lines of the active memory array, those access lines formed for the dummy memory array may be floating or not applied with any control signal.

In the illustrated embodiment of FIG. 10, an active memory array 1000A is formed in a corresponding one of the first areas 302A, and a dummy memory array 1000B is formed in a corresponding one of the second areas 302B. The active memory array 1000A includes a number of memory strings laterally spaced from one another. For example, eight memory strings 810A, 810B, 810C, 810D, 810E, 810F, 810G, and 810H are indicated. The memory strings 810A to 810D (on the left-hand side of a corresponding WL trench that is filled with an insulating material) share the same memory layer 802A. Each of the memory strings 810A to 810D has its own isolated semiconductor layer (channel) 802A, 802B, 802C, or 802D, and each of the memory strings 810A to 810D is coupled to a respective pair of BL 902A and SL 904A. Further, two memory strings disposed on opposite sides of the WL trench share the same pair of BL 902A and SL 904A. For example, the memory strings 810D and 810H share the same pair of BL 902A and SL 904A, with their semiconductor layers (channels) disposed on the opposite sides a corresponding WL trench that is filled with an insulating material.

The dummy memory array 1000B also includes a number of memory strings laterally spaced from one another. For example, six memory strings 820A, 820B, 820C, 820D, 820E, 820F are indicated. Each of the memory strings 820A to 820F has its own isolated memory layer 702B and its own isolated semiconductor layer (channel) 712B, and each of the memory strings 820A to 820F is coupled to a respective pair of BL 902B and SL 904B. Further, the memory layer 702B wraps around the semiconductor layer 712B, and the semiconductor layer 712B encloses a pair of BL 902B and SL 904B, with a dielectric pillar 716B interposed between the BL 902B and SL 904B.

FIGS. 11A-E show various configurations of the "dummy" memory string (e.g., 820A to 820F, which are sometimes referred to as "dummy memory strings 820" in the following discussions) formed in the second area 302B, according to various embodiments of the present disclosure. In each of the embodiments described below, a conductive sheet (e.g., WL) 1100 wraps around a portion of a vertically extending memory layer 1102, and the memory layer 1102 further wraps around a vertically extending semiconductor layer 1104.

For example, FIG. 11A illustrates a dummy memory string that includes the conductive sheet 1100 wrapping around the memory layer 1102 which further wraps around the semiconductor layer 1104, and the semiconductor layer 1104 encloses a pair of metallic pillars 1106A (e.g., a dummy SL and dummy BL) and a single dielectric pillar 1108A extending along the vertical direction and interposed between the pair of metallic pillars 1106A. FIG. 11B illustrates a dummy memory string that includes the conductive sheet 1100 wrapping around the memory layer 1102 which further wraps around the semiconductor layer 1104, and the semiconductor layer 1104 encloses a pair of dielectric pillars 1108B disposed on opposite sides of a single metallic pillar 1106B (e.g., a dummy SL or dummy BL). FIG. 11C illustrates a dummy memory string that includes the conductive sheet 1100 wrapping around the memory layer 1102 which further wraps around the semiconductor layer 1104, and the semiconductor layer 1104 encloses a single metallic pillar 1106C and a single dielectric pillar 1108C disposed on a side of the single metallic pillar 1106C. FIG. 11D illustrates a dummy memory string that includes the conductive sheet 1100 wrapping around the memory layer 1102 which further wraps around the semiconductor layer 1104, and the semiconductor layer 1104 encloses a single dielectric pillar layer 1108D. FIG. 11E illustrates a dummy memory string that includes the conductive sheet 1100 wrapping around the memory layer 1102 which further wraps around the semiconductor layer 1104, and the semiconductor layer 1104 encloses a single metallic pillar 1106E.

In some embodiments, each dummy memory string 820 in the second area 302B may have a cross-section different than the rectangular cross-section shown above. Using the configuration of FIG. 11E as a representative example, in FIG.

Figure 12A:
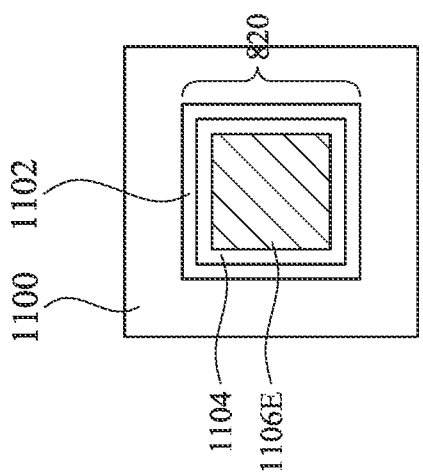
Figure 12B:
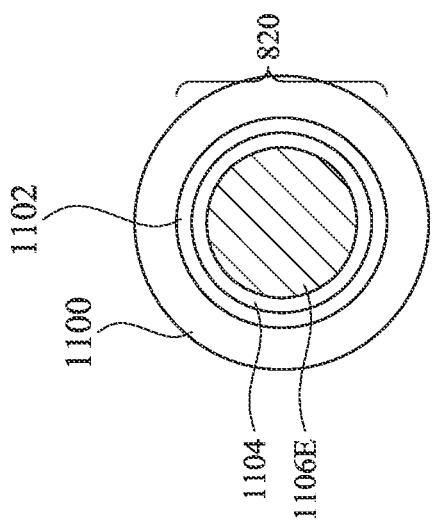
Figure 12C:
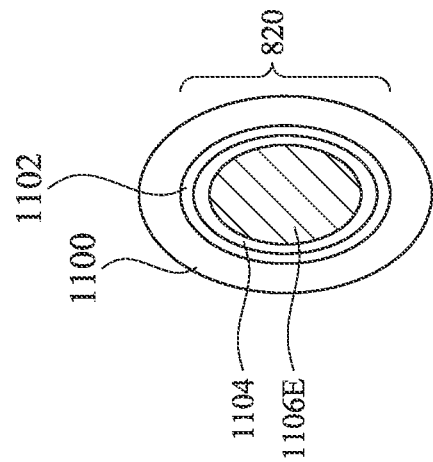

12A, the dummy memory string has the metallic pillar 1106E having a square cross-section, which is wrapped by the semiconductor layer 1104, which is wrapped by the memory layer 1102, which is wrapped by the conductive sheet 1100. In FIG. 12B, the dummy memory string has the metallic pillar 1106E having a circular cross-section, which is wrapped by the semiconductor layer 1104, which is wrapped by the memory layer 1102, which is wrapped by the conductive sheet 1100. In FIG. 12C, the dummy memory string has the metallic pillar 1106E having an elliptical cross-section, which is wrapped by the semiconductor layer 1104, which is wrapped by the memory layer 1102, which is wrapped by the conductive sheet 1100. It should be understood that each of the embodiments shown in FIGS. 12A-C can be applied to any of the other embodiments shown in FIGS. 11A-E.

Figure 13C:
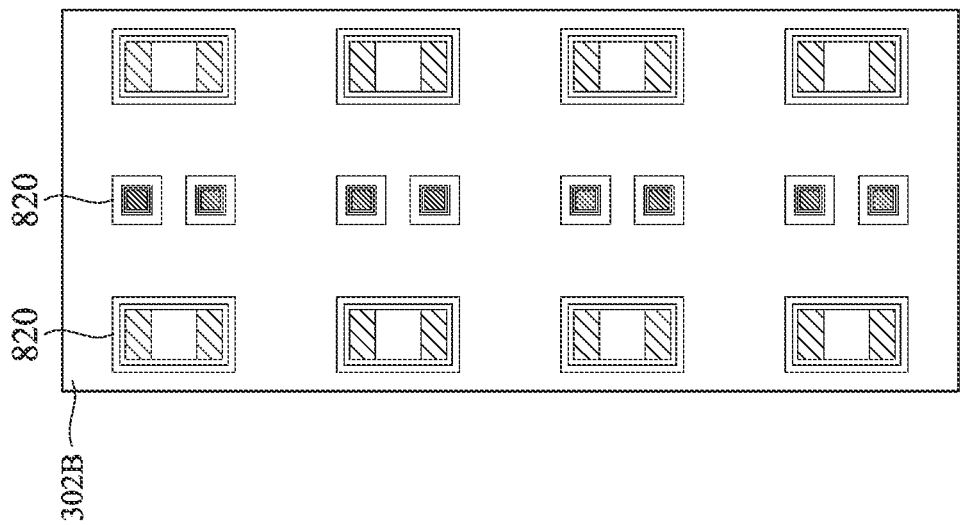
Figure 13B:
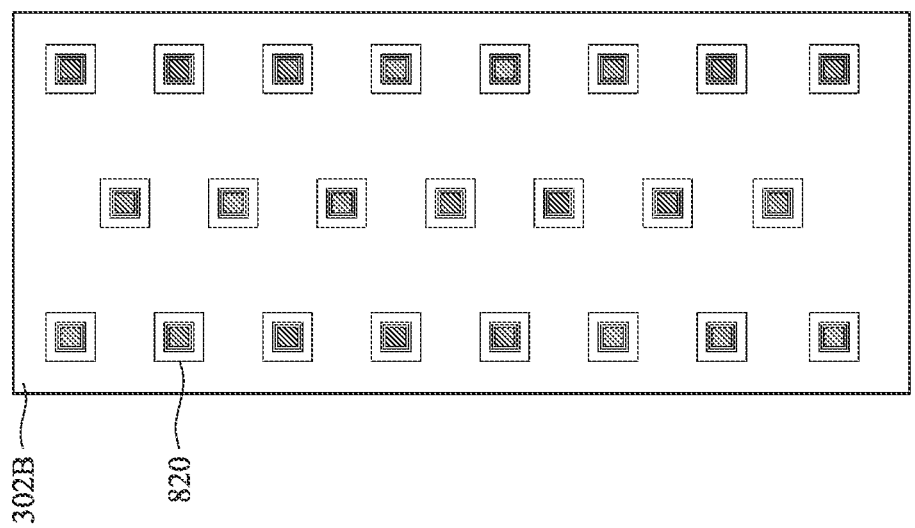
Figure 13A:
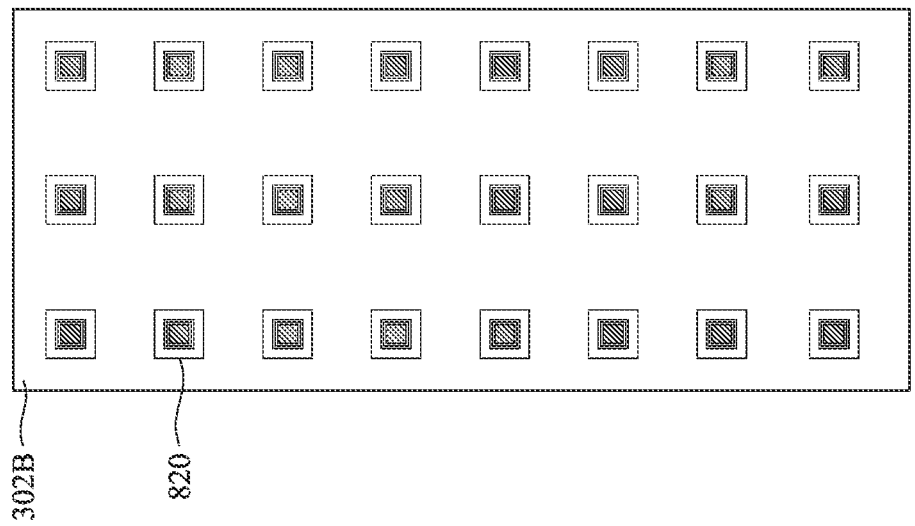
Figure 13F:
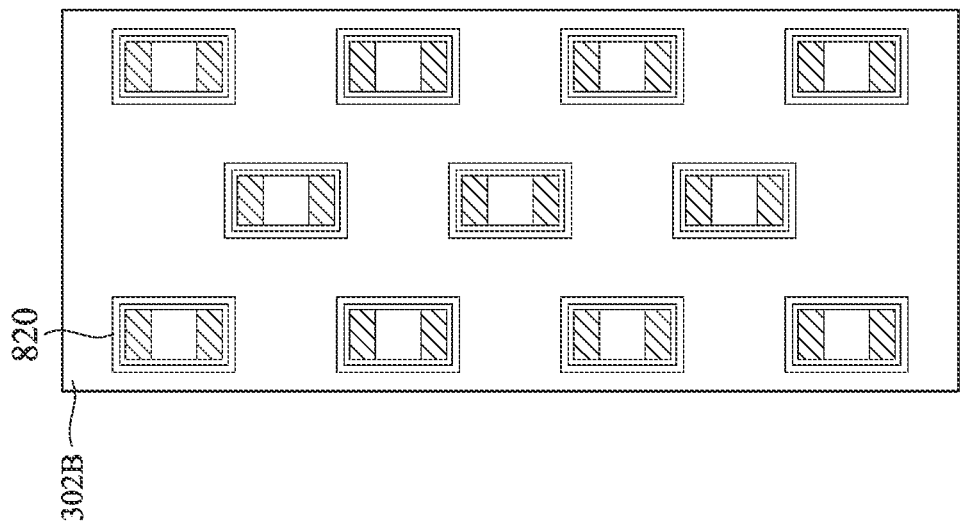
Figure 13E:
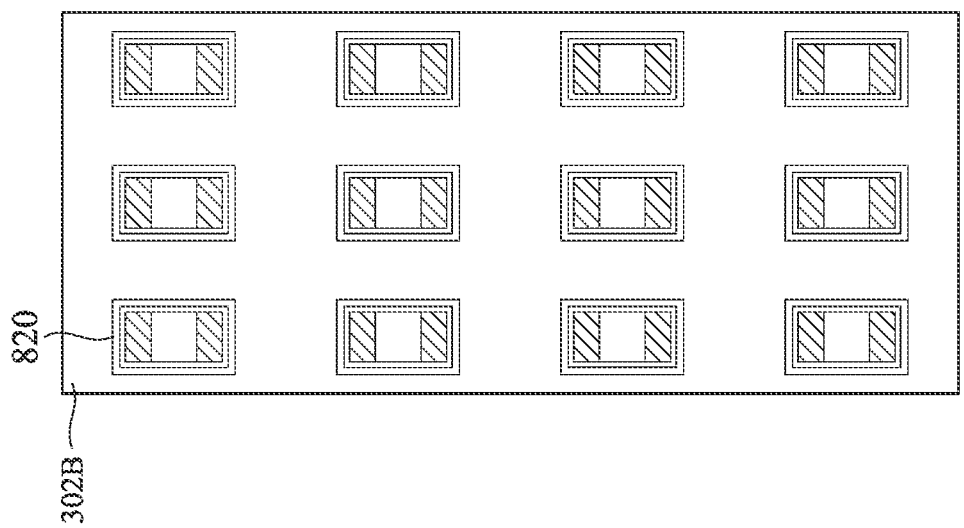
Figure 13D:
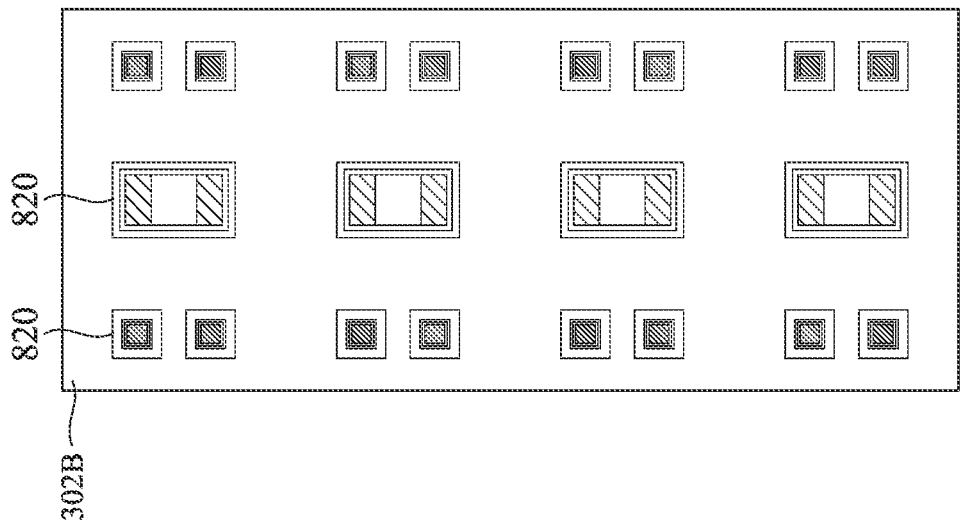

In some embodiments, the dummy memory strings 820 in the second area 302B may be disposed in various layouts. For example, as shown in FIG. 13A, the dummy memory strings 820 having square shapes may be disposed in a non-staggered manner. Stated another way, the dummy memory strings of each column are aligned with corresponding dummy memory strings of any other columns. For example, the bottommost memory string of the first column is aligned with the bottommost memory string of any other columns. In FIG. 13B, the dummy memory strings 820 having square shapes may be disposed in a staggered manner. Stated another way, the dummy memory strings of each column are misaligned with corresponding dummy memory strings of some other columns and aligned with corresponding dummy memory strings of some other columns. For example, the bottommost memory string of the first column is aligned with the bottommost memory string of the third column and misaligned with the bottommost memory string of the second column. In FIGS. 13C and 13D, the dummy memory strings 820 may have a combination of different shapes (e.g. a number of square shapes and a number of rectangular shapes). In FIG. 13E, the dummy memory strings 820 having rectangular shape may be disposed in a non-staggered manner. In FIG. 13F, the dummy memory strings 820 having rectangular shape may be disposed in a staggered manner.

In one aspect of the present disclosure, a memory device is disclosed. The memory device includes a substrate including a first area and a second area. The first area of the memory device includes a plurality of first conductive stripes spaced from one another along a vertical direction, a first memory layer extending along the vertical direction, a first semiconductor layer extending along the vertical direction and coupled to a portion of the first memory layer, and second and third conductive stripes extending along the vertical direction, wherein the second and third conductive stripes are coupled to end portions of a sidewall of the first semiconductor layer. The second area of the memory device includes a plurality of conductive sheets spaced from one another along the vertical direction, a second memory layer extending along the vertical direction and wrapped by the plurality of conductive sheets, and a second semiconductor layer extending along the vertical direction and wrapped by the second memory layer.

In another aspect of the present disclosure, a memory device is disclosed. The memory device includes a plurality of active memory arrays disposed over a substrate. The memory device further includes a plurality of dummy memory arrays disposed over the substrate, wherein each of the plurality of active memory arrays is interposed between a pair of the plurality of dummy memory arrays along a first lateral direction. Each of the plurality of active memory arrays comprises a plurality of first memory layers extending along a vertical direction and a plurality of first semiconductor layers extending along the vertical direction, and each of the plurality of dummy memory arrays comprises a plurality of second memory layers extending along the vertical direction and a plurality of second semiconductor layers extending along the vertical direction.

In yet another aspect of the present disclosure, a method for fabricating memory devices is disclosed. The method includes concurrently forming, over a first area of a substrate, a plurality of conductive stripes separated from one another along a vertical direction and extending along a first lateral direction, and forming, over a second area of the substrate, a plurality of conductive sheets separated from one another along the vertical direction and extending along the first lateral direction. The method further includes forming a first memory layer extending along the vertical direction and coupled to the plurality of conductive stripes, forming a first semiconductor layer extending along the vertical direction and coupled to a portion of the first memory layer, forming a second memory layer extending along the vertical direction and wrapped by the plurality of conductive sheets, and forming a second semiconductor layer extending along the vertical direction and wrapped by the second memory layer.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a substrate including a first area and a second area;
   wherein the memory device, in the first area, comprises:
      a plurality of first conductive stripes extending along a lateral direction and spaced from one another along a vertical direction;
      a first memory layer extending along the vertical direction;
      a first semiconductor layer extending along the vertical direction and coupled to a portion of the first memory layer; and
      second and third conductive stripes extending along the vertical direction, wherein the second and third conductive stripes are coupled to end portions of a sidewall of the first semiconductor layer; and
   wherein the memory device, in the second area, comprises:
      a plurality of conductive sheets extending along the lateral direction and spaced from one another along the vertical direction;

a second memory layer extending along the vertical direction and wrapped by the plurality of conductive sheets; and a second semiconductor layer extending along the vertical direction and wrapped by the second memory layer.

2. The memory device of claim 1, wherein the first area is located immediately next to the second area.

3. The memory device of claim 1, wherein the second memory layer continuously extends along the vertical direction, with a plurality of portions discretely wrapped by the plurality of conductive sheets, respectively.

4. The memory device of claim 1, wherein the second semiconductor layer continuously extends along the vertical direction, with a plurality of portions discretely wrapped by the plurality of conductive sheets, respectively.

5. The memory device of claim 1, wherein the plurality of first conductive stripes, the first memory layer, the first semiconductor layer, and the second and third conductive stripes collectively function as a portion of an active memory array, while the plurality of conductive sheets, the second memory layer, and the second semiconductor layer collectively function as a portion of a dummy memory array.

6. The memory device of claim 1, wherein the memory device, in the second area, further comprises:
a pair of fourth conductive stripes extending along the vertical direction;
wherein the second semiconductor layer wraps the pair of fourth conductive stripes and a single dielectric pillar interposed between the pair of fourth conductive stripes.

7. The memory device of claim 1, wherein the memory device, in the second area, further comprises:
a single fifth conductive structure extending along the vertical direction;
wherein the second semiconductor layer wraps the fifth conductive structure and a pair of dielectric pillars disposed on opposite sides of the single fifth conductive structure, respectively.

8. The memory device of claim 1, wherein the memory device, in the second area, further comprises:
a single sixth conductive structure extending along the vertical direction;
wherein the second semiconductor layer wraps the sixth conductive structure and a single dielectric pillar disposed on a side of the sixth conductive structure.

9. The memory device of claim 1, further comprises:
a dielectric pillar extending along the vertical direction;
wherein the second semiconductor layer wraps the dielectric pillar, with no conductive material disposed between the dielectric pillar and the second semiconductor layer.

10. The memory device of claim 1, further comprises:
a single seventh conductive structure extending along the vertical direction;
wherein the second semiconductor layer wraps the single seventh conductive structure, with no dielectric material disposed between the single seventh conductive structure and the second semiconductor layer.

11. The memory device of claim 10, wherein the single seventh conductive structure has a cross-section with a rectangular shape, a square shape, a circular shape, or an elliptical shape.

12. A memory device, comprising:
a plurality of active memory arrays disposed over a substrate; and a plurality of dummy memory arrays disposed over the substrate, wherein each of the plurality of active memory arrays is interposed between a pair of the plurality of dummy memory arrays along a first lateral direction;
wherein each of the plurality of active memory arrays comprises a plurality of first memory layers extending along a vertical direction and a plurality of first semiconductor layers extending along the vertical direction; and
wherein each of the plurality of dummy memory arrays comprises a plurality of second memory layers extending along the vertical direction and a plurality of second semiconductor layers extending along the vertical direction.

13. The memory device of claim 12, wherein one of the plurality of first semiconductor layers extends along a portion of a sidewall of a corresponding one of the plurality of first memory layers.

14. The memory device of claim 12, wherein one of the plurality of second memory layers wraps around a corresponding one of the plurality of second semiconductor layers.

15. The memory device of claim 14, wherein each of the plurality of second semiconductor layers surrounds at least one of: a conductive structure extending along the vertical direction or a dielectric pillar extending along the vertical direction.

16. The memory device of claim 12, wherein each of the plurality of active memory arrays comprises a plurality of conductive stripes separated from one another along the vertical direction and extending along a second lateral direction perpendicular to the first lateral direction.

17. The memory device of claim 15, wherein each of the plurality of dummy memory arrays comprises a plurality of conductive sheets separated from one another along the vertical direction and extending along a second lateral direction perpendicular to the first lateral direction.

18. A memory device, comprising:
a plurality of active memory arrays disposed over a substrate; and
a plurality of dummy memory arrays disposed over the substrate, wherein the plurality of active memory arrays and the plurality of dummy arrays are arranged in an alternating pattern along a first lateral direction;
wherein each of the plurality of active memory arrays comprises a plurality of first memory layers extending along a vertical direction and a plurality of first semiconductor layers extending along the vertical direction; and
wherein each of the plurality of dummy memory arrays comprises a plurality of second memory layers extending along the vertical direction and a plurality of second semiconductor layers extending along the vertical direction, each of the plurality of second semiconductor layers encloses each corresponding one of the second memory layers.

19. The memory device of claim 18, wherein each of the plurality of second semiconductor layers encloses a conductive structure extending along the vertical direction, a dielectric pillar extending along the vertical direction, or both.

20. The memory device of claim 19, wherein each of the plurality of second semiconductor layers encloses the conductive structure and the dielectric pillar, and wherein the dielectric pillar is interposed between portions of the conductive structure.

* * * * *